US011981013B2

(12) United States Patent
Moore et al.

(10) Patent No.: US 11,981,013 B2
(45) Date of Patent: May 14, 2024

(54) DUST COVER FOR HAMMER WORK TOOL

(71) Applicant: Caterpillar Inc., Peoria, IL (US)

(72) Inventors: Cody T. Moore, Lorena, TX (US); Manoj Kumar, Bangalore (IN); Hariom Kumar Gupta, Chennai (IN); Gurbaz Singh, Chandigarh (IN); Akshay Deepak Mate, Pune (IN); Chetan Vilas Dahiwal, Chennai (IN)

(73) Assignee: Caterpillar Inc., Peoria, IL (US)

( * ) Notice: Subject to any disclaimer, the term of this patent is extended or adjusted under 35 U.S.C. 154(b) by 772 days.

(21) Appl. No.: 17/102,091

(22) Filed: Nov. 23, 2020

(65) Prior Publication Data

US 2022/0161407 A1 May 26, 2022

(51) Int. Cl.
*B25D 17/20* (2006.01)
*E02F 3/96* (2006.01)

(52) U.S. Cl.
CPC .............. *B25D 17/20* (2013.01); *E02F 3/966* (2013.01); *B25D 2217/0065* (2013.01)

(58) Field of Classification Search
CPC ................................ E02F 3/966; E02F 9/0891
See application file for complete search history.

(56) References Cited

U.S. PATENT DOCUMENTS 5,137,096 A * 8/1992 Druesdow .............. B25D 17/11 173/171
10,076,831 B2 * 9/2018 Moore ................... B25D 17/06
10,399,196 B2 * 9/2019 Lahtinen ................. E02F 3/966
2014/0208575 A1 * 7/2014 Jagdale ................... E02F 3/966 411/103
2015/0041168 A1 * 2/2015 Dostinov ............... B25D 17/20 173/90
2016/0184982 A1 * 6/2016 Dostinov ................ E02F 3/966 173/90
2016/0303728 A1 * 10/2016 Chapagain ............. B25D 17/24
2019/0381645 A1 * 12/2019 Beckhusen .............. B25D 9/04

FOREIGN PATENT DOCUMENTS

EP 3550081 A1 10/2019
EP 3584037 A1 * 12/2019 ............. B25D 17/00
EP 3584037 A1 12/2019
(Continued)

OTHER PUBLICATIONS

Written Opinion and International Search Report for Int'l. Patent Appln. No. PCT/US2021/060036, dated Mar. 9, 2022 (10 pgs).

*Primary Examiner* — Eyamindae C Jallow

(57) ABSTRACT

A dust cover for a hammer work tool, a hammer work tool, and a method of attaching the same are disclosed. The hammer work tool includes a housing, a power cell enclosed inside the housing, a tool member, and a detachable dust cover. When attached, the dust cover prevents particulate matter from entering the housing. When detached, a housing opening uncovered by the dust cover provides access to the power cell for maintenance and repairs. During installation, a housing rim and a locking tab of the hammer work tool are respectively received by a groove and a locking tab receiver of the dust cover. Advantageously, the dust cover is durable, cost effective, and easily attached and detached without the use of additional tools.

20 Claims, 7 Drawing Sheets

(56) References Cited

FOREIGN PATENT DOCUMENTS

| | | | |
|---|---|---|---|
| JP | 1034563 | A | 2/1998 |
| JP | 2015160283 | A | 9/2015 |
| KR | 200437301 | Y1 | 11/2007 |
| KR | 20090013148 | U | 12/2009 |
| KR | 20160067339 | A | 6/2016 |

* cited by examiner

DUST COVER FOR HAMMER WORK TOOL

TECHNICAL FIELD

The present disclosure generally relates to hydraulic and pneumatic work tools and, more specifically, relates to hammer work tools having dust protection covers.

BACKGROUND

A breaker work tool or hammer work tool is commonly used in construction and mining operations to break rock boulders. The hammer can be mounted onto an excavator, backhoe, utility loader, or similar machine via a mounting bracket and is one of many possible work tool attachments, including augers, buckets, trenchers, and the like. During operation, high pressure fluid accelerates a tool member of the hammer, causing the tool member to strike, singularly or repeatedly, with great force. When the striking tool member contacts a rock boulder, impact energy is transferred thereto, creating a shockwave across the boulder and breaking it into smaller pieces.

Repeated impacts from the hammer tends to generate dust and particulate matter in the vicinity of the impact site, which can infiltrate the hammer, entangle with its machinery, and lower the service life of the tool. In many hammers, an exterior housing encloses and protects an internal power cell, while a detachable dust cover provides discretionary access to the power cell's components. When attached, the dust cover blocks dust and other matter from entering the housing; and, when detached, the dust cover enables access for maintenance and repair of internal machinery. Unfortunately, existing dust cover designs suffer from several flaws. For example, they are costly to manufacture, cumbersome, and difficult to assemble and disassemble, a process often requiring specialized tools or experience. Due to the latter reasons, many users are discouraged from servicing the power cell or from reinstalling the dust cover thereafter.

One example of prior art is found in Japanese Publication No. JP2015160283A by Nobuyoshi Fukui et al., which discloses a bracket for installation of a hydraulic breaker attachment, the bracket comprising a detachable top plate. While the top plate of Fukui provides access to the internal machinery of the hydraulic breaker, the design may fail to properly protect the power cell from either dust or more powerful impacts. Moreover, similar to the state of the art, the top plate of Fukui is unwieldy during the installation process and not sturdy when fully installed. Accordingly, there remains a need in the art for a dust cover capable of shielding a hammer work tool against particulate matter while remaining reliable, accessible, and easy to install and uninstall

SUMMARY OF THE DISCLOSURE

According to one aspect of the present disclosure, a dust cover for a hammer work tool is disclosed. The dust cover includes a plate having an interior surface, an exterior surface, and a perimeter; a plurality of interior ribs extending from the interior surface; a handle extending from the exterior surface; a groove circumscribing a majority of the perimeter; and a locking tab receiver.

According to another aspect of the present disclosure, a hammer work tool is disclosed. The hammer work tool includes a housing with a housing opening, a housing rim defining the housing opening, and a locking tab protruding from the housing rim; a power cell enclosed inside the housing and comprising a valve body and an accumulator; a tool member operatively associated with the power cell; and a dust cover. The dust cover further includes a plate having an interior surface, an exterior surface, and a perimeter; a plurality of interior ribs extending from the interior surface; a handle extending from the exterior surface; a groove circumscribing a majority of the perimeter; and a locking tab receiver. The groove is configured to receive the housing rim and the locking tab receiver is configured to receive the locking tab.

According to yet another aspect of the present disclosure, a method for attaching a dust cover onto a hammer work tool is disclosed. The method includes the steps of providing a dust cover and a hammer work tool in accordance with any embodiment of the present disclosure; inserting a lower portion of a housing rim of the hammer work tool into a lower portion of a groove of the dust cover; inserting a locking tab of the hammer work tool into a locking tab receiver of the dust cover; and inserting an upper portion of the housing rim into an upper portion of the groove. The method is carried out by a single user without the use of additional tools.

These and other aspects and features of the present disclosure will be more readily understood after reading the following detailed description in conjunction with the accompanying drawings.

DETAILED DESCRIPTION

Figure 1:
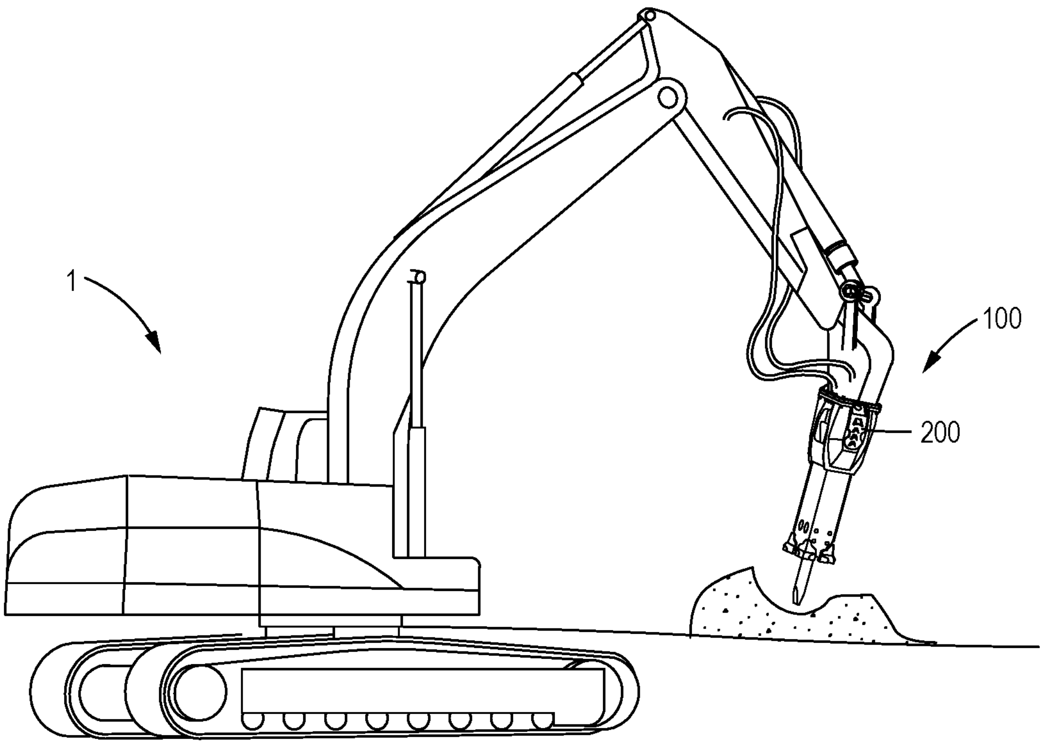
FIG. 1 is a perspective view of a work machine according to one embodiment of the present disclosure.

Referring now to the drawings and with specific reference to FIG. 1, a work machine in accordance with the present disclosure is generally referred to by a reference numeral 1. The work machine 1 may be a stationary machine or work vehicle designed for construction and earthwork operations, such the excavator shown, or can be any number of other work machines such as but not limited to front loaders, backhoes, bulldozers, mini-excavators, skid steers, and the like. A boom, lift arm, or combination thereof may be attached to the machine 1 at a proximate end and attached to a work tool 100 at a distal end, the boom or lift arm being configured to move and operatively control one or more functions of the work tool 100 through pneumatic, hydraulic, or other means. For many such machines 1, the work tool 100 is detachably mounted and can be exchanged for another tool depending on the specific job at hand. Common work tool attachments in the art may include a hammer work tool 100 such as the one shown in FIG. 1, but may also include other implementations such as but not limited to augers, backhoes, buckets, grapples, compactors, and the like. According to an embodiment of the disclosure, the work tool 100 comprises a dust cover 200 configured to prevent particulate matter from entering and potentially damaging the tool.

Figure 2:
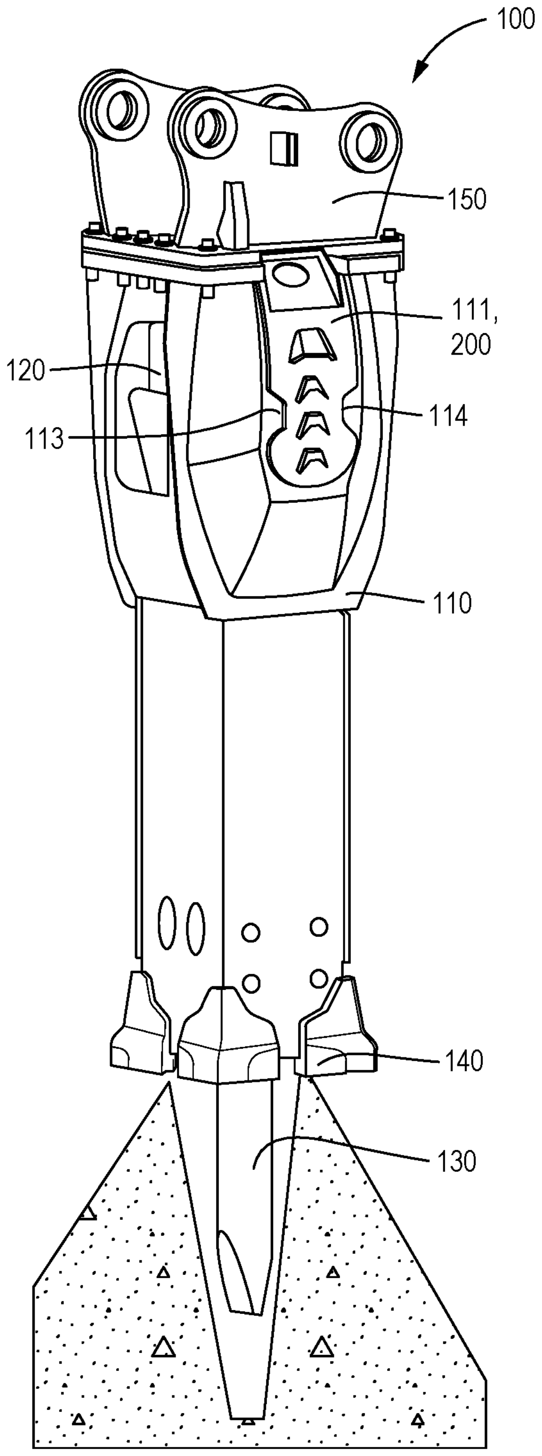
FIG. 2 is a perspective view of a hammer work tool according to another embodiment of the present disclosure.

Turning now to FIG. 2, a detailed perspective view of the hammer work tool 100 from FIG. 1 is provided. The hammer work tool 100 includes a housing 110, a power cell 120 enclosed inside the housing 110, and a tool member 130 operatively associated with the power cell 120. The power cell 120, which generates the operating force of the tool member 130, further includes a valve body and an accumulator, and may also include a front head, cylinder, piston, and one or more tie rods (not shown). In one embodiment, a spray nozzle 140 attached to the housing 110 and directed near a point of impact of the tool member 130 provides dust suppression during the hammer's 100 breaking action. And in another embodiment, the hammer work tool 100 is operatively connected to the work machine 1 through a mounting bracket 150. While a hammer attachment is shown, it should be understood that the hammer work tool 100 may also be an independent tool, such as a standalone jackhammer or a pavement breaker.

The housing 110 of the hammer work tool 100 may further comprise a housing opening 111 providing access to the power cell 120, a housing rim 112 defining the housing opening 111, a locking tab 113 protruding from the housing rim 112 and, in some embodiments, a second, non-locking tab 114 protruding from the housing rim 112. However, as seen in FIG. 2, a dust cover 200 is removably attached to the hammer work tool 100 and fully covers the housing opening 111. Accordingly, the dust cover 200 may be substantially similar in size and shape to that of the opening 111. When the dust cover 200 is detached, the opening 111 provides access to at least the valve body and the accumulator of the power cell 120; and, when attached, the dust cover 200 blocks the opening 111 and prevents particulate matter from entering the housing 110. In an embodiment, the cover 200 further protects the hammer work tool 100 from higher energy impacts or projectiles that could be created during the breaking action. And in another embodiment, the cover 200 and the seal between the cover 200 and the housing 110 may be water-resistant or even water-proof, such that the hammer 100 is also protected against liquid incursions.

Figure 3:
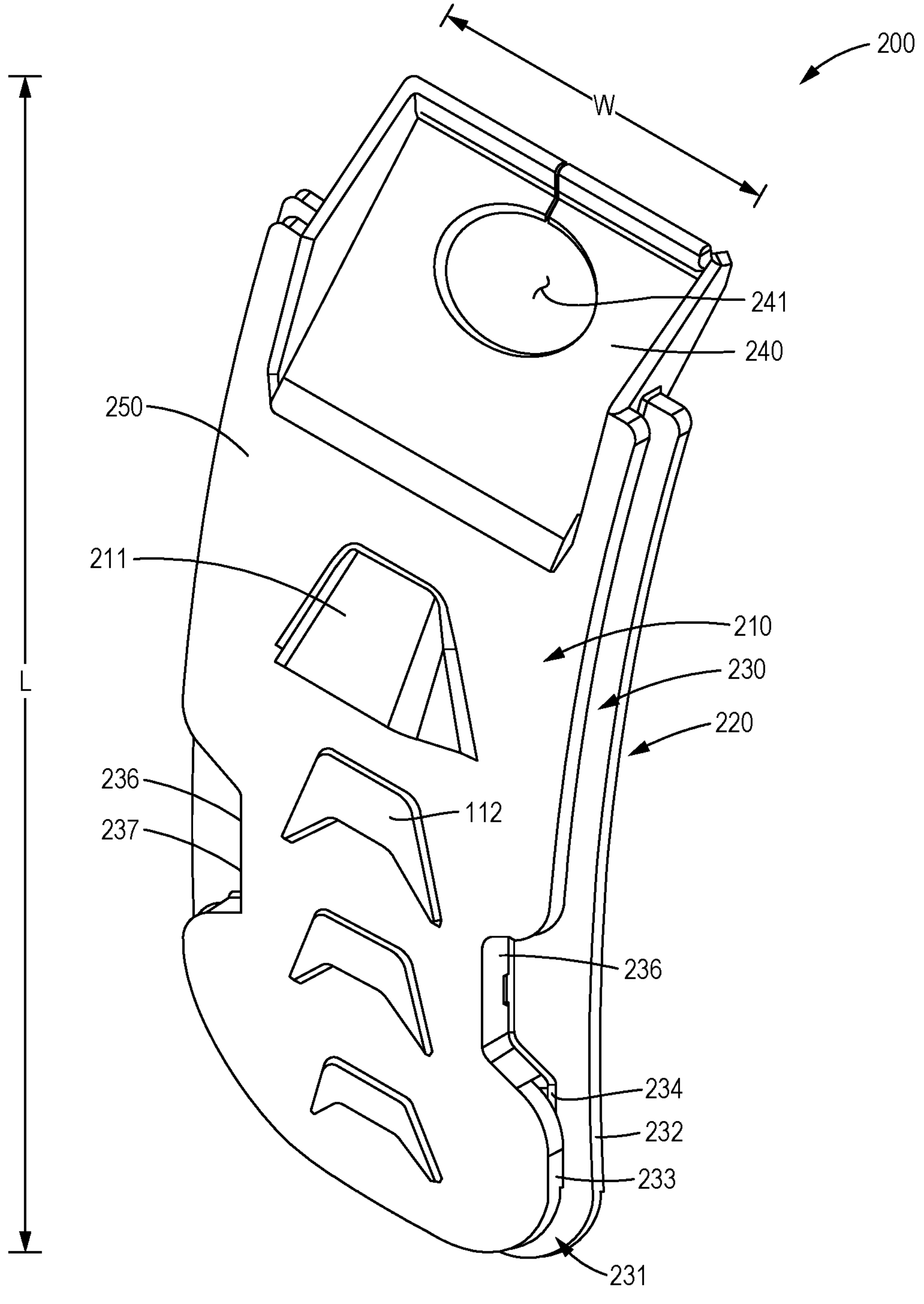
FIG. 3 is a perspective view of a dust cover according to another embodiment of the present disclosure.

Turning now to FIG. 3, a detailed perspective view of the dust cover 200 according to an embodiment of the present disclosure is shown. The dust cover 200 includes a plate having a predominantly arcuate and planar shape, with a length L and width W significantly greater than its thickness T. An exterior surface 210 faces the convex side of the cover 200 and the outside of the hammer work tool 100 when installed; an interior surface 220 faces the concave side of the cover 200 and the inside of the hammer work tool 100 when installed; and a perimeter 230 encircles the cover 200. The cover 200 may be substantially symmetrical lengthwise (across a bisecting plane perpendicular to the width W), although important discrepancies may exist in some or all embodiments. In an embodiment, the cover 200 has a thickness of between 5 mm and 11 mm, preferably between 7 mm and 9 mm, and even more preferably 8 mm.

In an embodiment, the cover 200 may further include a rectilinear shelf 240 located at an upper end of the cover 200 with a circular channel 241 connecting the exterior surface 210 to the interior surface 220. The circular channel 241 may be radiused to allow a hose associated with the hammer work tool 100 to pass through, for instance, to supply a pressurized working fluid (not shown). The channel 241 radius may be equal to or greater than the radius of the hose and designs with multiple channels 241 fitted for multiple hoses are also contemplated.

In another embodiment, a wire 250 is fully enclosed inside the dust cover 200 and provides structural support to the dust cover 200. The wire 250 is preferably a steel wire, such as a carbon steel or low alloy steel commonly used in reinforcement applications, but other materials and composites may also be employed. Moreover, the wire 250 may be configured in any size, shape or orientation within the cover 200, may be a singular wire or a plurality of wires, or may be configured as a mesh, such as a planar mesh or a three-dimensional mesh.

With continued reference to FIG. 3, a handle 211 extends from the exterior surface 210 and may be any type or shape of handle suitable for grasping by one or both hands of a user. In addition, one or more exterior ribs 212 may be raised from the exterior surface 210 and provide structural support to the cover 200. The handle 211 and the one or more exterior ribs 212 may be symmetrically centered across the bisecting plane and may be spaced evenly apart. In some embodiments, one of the exterior ribs 212 doubles as the handle 211 (e.g. acts as both an exterior rib 212 and a handle 211) or vice versa, or multiple exterior ribs 212 double as multiple handles 211 or vice versa.

Figure 4:
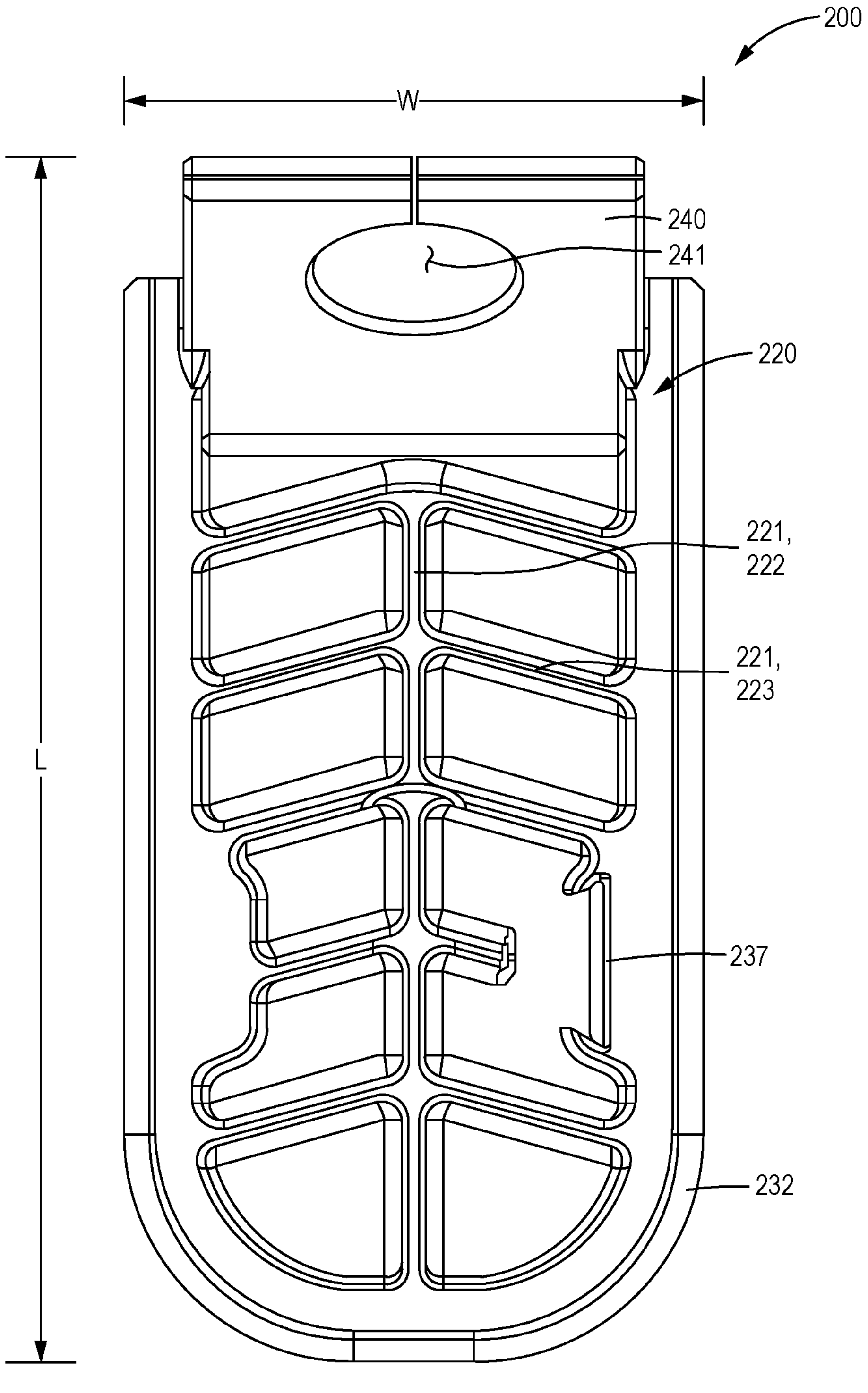
FIG. 4 is a rear view of a dust cover according to another embodiment of the present disclosure.

Turning now to FIG. 4, the rear side and interior surface 220 of the cover 200 are shown in detail. A plurality of interior ribs 221 are raised from the interior surface 220 and provide structural support to the dust cover 200. The plurality of interior ribs 221 may be arranged substantially symmetrically across the bisecting plane, with a single, center rib 222 running lengthwise and side ribs 223 extending outwards and spaced at regular intervals. It should be noted that the interior ribbing 221 may not be present in the vicinity of a locking tab receiver 237 associated with a locking mechanism of the cover 200. Moreover, the arrangement of the interior ribs 221 may conform to the shape of the work tool to which the cover 200 is attached and, especially, to the shape of an internal machinery of the work tool, where said internal machinery may or may not abut against the interior surface 220. Furthermore, while a center rib 222 and side ribs 223 are shown, other configurations are also contemplated and the number and arrangement of the plurality of interior ribs 221, as well as the size and shape of each individual rib 221, may be chosen according to specific applicational requirements. In an embodiment, each interior rib 221 has filleted edges and a thickness of between 5 mm and 15 mm square, preferably between 8 mm and 12 mm square, and even more preferably 10 mm square.

In an embodiment, the dust cover 200 is manufactured using compression molding techniques and may be made from any number of compression moldable materials, including thermoset resins, thermoplastics, polyimide-based plastics, and others. Some or all of the components of the cover 200, including the handle 211, exterior ribs 212 and interior ribs 221, may be formed in the same molding process or may be installed separately afterwards using various techniques known in the art. With all components included, the dust cover 200 may have a total weight of between 1.5 kg and 2.0 kg, preferably between 1.7 kg and 1.8 kg, and even more preferably 1.76 kg.

Figure 5:
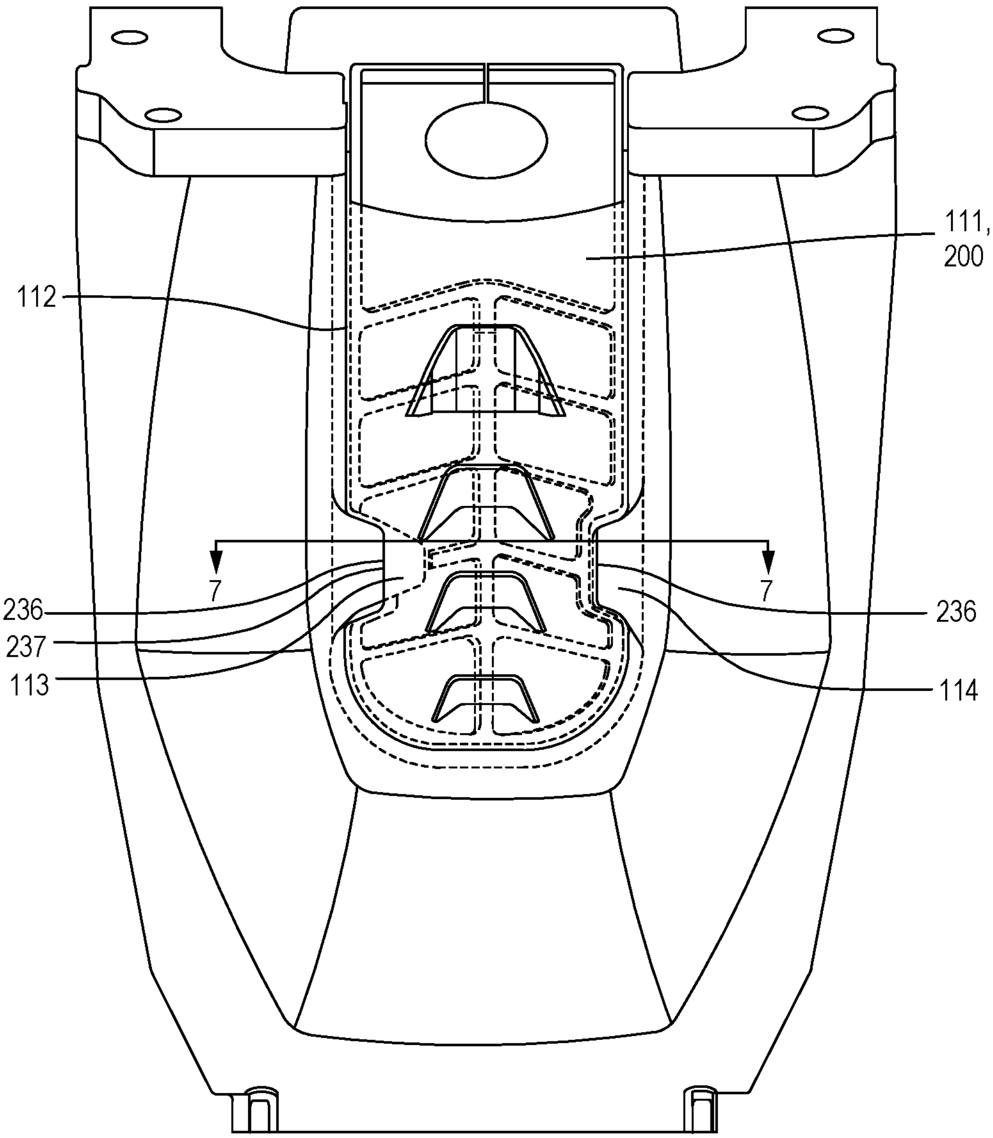
FIG. 5 is a transparent front view of a dust cover and a hammer work tool housing according to another embodiment of the present disclosure.
Figure 6:
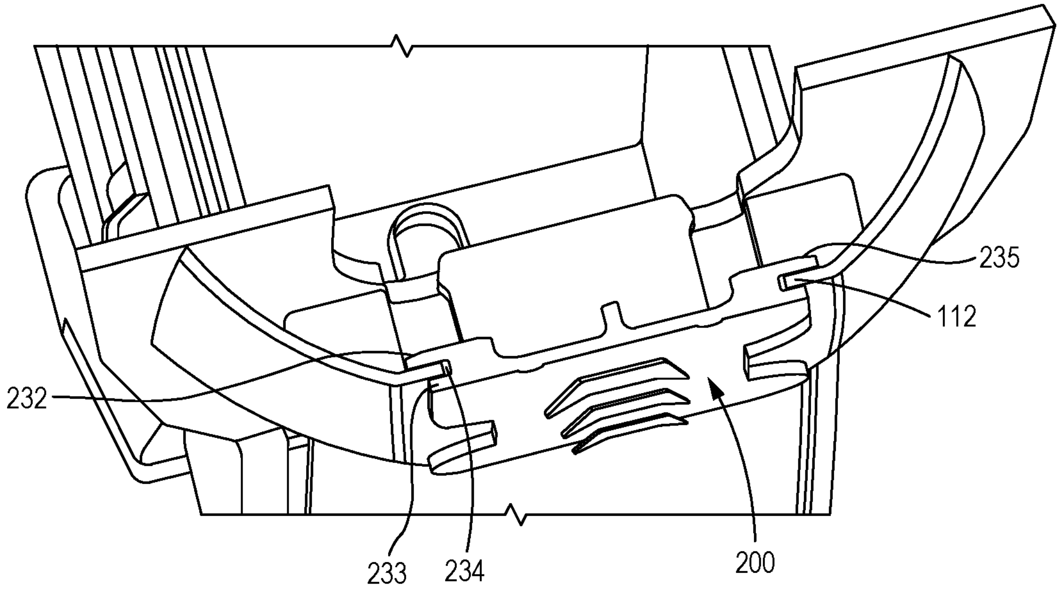
FIG. 6 is a cutaway view of the dust cover and the hammer work tool housing shown in FIG. 5.
Figure 7:
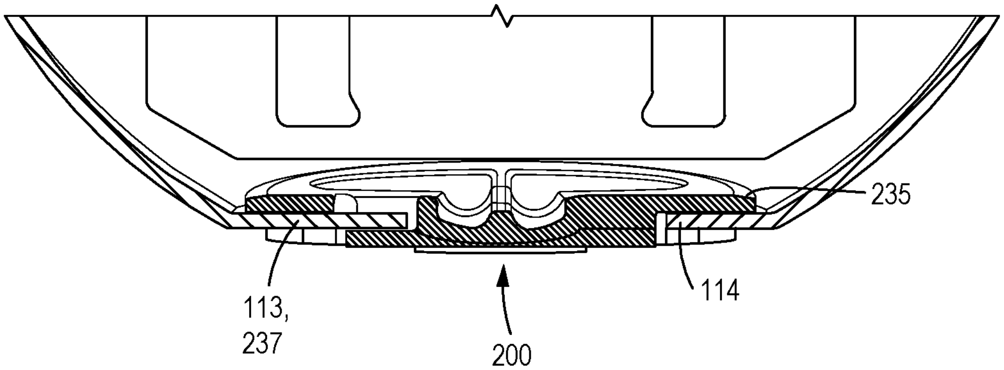
FIG. 7 is a sectional view along cutting plane 7-7 of the dust cover and the hammer work tool housing shown in FIG. 5.
Figure 8:
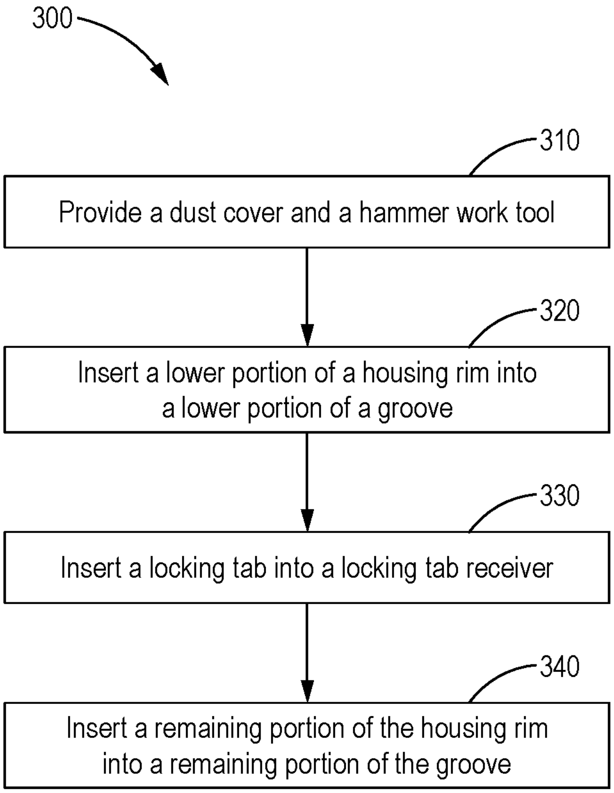
FIG. 8 is a flowchart representing a method for attaching a dust cover onto a hammer work tool according to another embodiment of the present disclosure.

The locking mechanism whereby the cover 200 is attached to the hammer work tool 100 is best described in conjunction with FIGS. 3-7. FIG. 5 shows a transparent front view of a dust cover 200 attached to a hammer work tool 100 in accordance with the present disclosure. FIG. 6 is a cutaway view of the dust cover 200 and the hammer work tool 100 shown in FIG. 5 and FIG. 7 is a sectional view along a cutting plane 7-7 of the same. As seen in FIG. 3, a groove 231 circumscribes a majority of the perimeter 230 of the dust cover 200, with the exception of the rectilinear shelf 240 and recesses 236. The groove 231 may further include an interior tab 232 proximal to the interior surface 220, an exterior tab 233 proximal to the exterior surface 210, and a valley 234 formed between the interior tab 232 and the exterior tab 233. The recesses 236 may be defined by a segment of the perimeter 230 on which the exterior tab 233 and valley 234 are recessed, but on which the interior tab 232 is unaffected. Accordingly, no groove 231 can be formed therein. Moreover, the recesses 236 may divide the groove 231 into a lower portion, located lengthwise below the recesses 236, and an upper portion, located lengthwise above the recesses 236. The dust cover 200 also includes a locking tab receiver 237, with may be an aperture perpendicular to the width dimension W and, in some embodiments, located in one of the recesses 236.

As shown in FIG. 6, the housing rim 112 of the housing 110 is configured to closely fit into the groove 231 of the dust cover 200 when installed, such that little to no movement is allowed between the two components. More specifically, the interior tab 232 may be configured to abut an inside of the housing rim 112 and the exterior tab 233 configured to abut an outside of the housing rim 112. The overlap between either tab 232, 233 and the housing rim 112 thereby prevents detachment of the cover 200 when there is no external user intervention. In an embodiment, the interior tab 232 may be longer than the exterior tab 233. And in another embodiment, the interior tab 232 further comprises an entry chamfer 235, which may be distal to the valley 234 and reduces the force necessary during an attachment procedure.

Turning now to FIG. 5, the locking tab receiver 237 of the dust cover 200 is shown with greater clarity. The locking tab receiver 237, which may be an aperture of the cover 200 perpendicular to the width dimension W, is configured to receive the locking tab 113 of the housing 110. Furthermore, when fully installed, the locking tab 113 may penetrate and closely fit inside the locking tab receiver 237, such that the cover 200 is restricted in all degrees of motion. In an embodiment where the locking tab receiver 237 is located in one of the recesses 236, the locking tab 113 may also insert into the recess 236 with varying levels of tolerance. And in another embodiment, the non-locking tab 114 of the housing 110 may insert into a separate recess 236 opposite that accommodating the locking tab receiver 237, further securing the cover 200 in place.

Referring back to FIG. 4, on the interior surface 220 of the cover 200, the plurality of interior ribs 221 may be suspended near the vicinity of the locking tab receiver 237 to allow space for the locking tab 113 after installation. Moreover, the size of the locking tab receiver 237 and the vacancy provided by the interior ribs 221 may be similar or identical to the dimensions of the locking tab 113; or the size and shape of the locking tab 113 may be configured to closely fit into the locking tab receiver 237 and the vacancy formed by the interior ribs 221. In short, the design of the two, interlocking components may be complementary. In an embodiment, the locking tab receiver 237 may be alternatively placed on an opposite side of the dust cover 200 or on both sides of the dust cover 200, and the locking tab 113 moved or doubled accordingly.

It should be understood that the design of the cover 200 prevents attachment and detachment from the hammer 100 without external human intervention. However, the cover 200 and, optionally, the housing rim 112 are flexible enough to allow a single user to install and uninstall the cover 200 from the housing 110 with little effort and without the use of additional tools.

INDUSTRIAL APPLICATION

The present disclosure may find industrial applicability in any number of work tools and work tool attachments where it is desirable to shield the internal components of the work tool from particulate matter. The work tool may be one capable of operating independently, for example a stand-alone jackhammer, digger, rock drill, pavement breaker, rivet buster, or the like; or it may be an attachment on a larger work machine such as the one shown in FIG. 1, for example an excavator, mini-excavator, backhoe, skid steer, utility loader, or the like.

Many of these tools operate in construction and mining environments heavily exposed to dust and debris. Consequently, the dust cover 200 prevents entry of particulate matter into the machine while also providing access to internal components for maintenance and repairs. By refining the locking mechanism, structural engineering and ergonomics of the dust cover 200, the present disclosure simplifies the attachment/detachment process without sacrificing functionality. Users can more easily manipulate the dust cover 200 without the use of additional tools and the dust cover 200 can provide a same or greater level of reliability and strength. From a manufacturing standpoint, the dust cover 200 of the present disclosure requires cheaper tooling costs and thus cheaper production costs, especially at low volume.

In general, exposure to dust is particularly prevalent when it comes to hammer work tools 100. Consequently, the effects of dust may be more detrimental and the design of the dust cover 200 more impactful. Therefore, while many different work tools and work tool configurations are possible and contemplated, the dust cover 200 is preferably applied to the hammer work tool 100 of the present disclosure. More specifically, the dust cover 200 may be installed onto a housing 110 of the hammer 100 so as to protect a power cell 120 enclosed inside.

An exemplary installation process is outlined in FIG. 7, wherein a method of attaching a dust cover 200 onto a hammer work tool 100 in accordance with the present disclosure is generally referred to by a reference numeral 300. In a first step 310, a hammer work tool 100 and a dust cover 200 according to any of the foregoing embodiments are provided. In a second step 320, a lower portion of the housing rim 112 is inserted into a lower portion of the groove 231, which may be the portion of the groove 231 lengthwise below the recesses 236. Consequently, the interior tab 232 may abut the inside of the housing rim 112 and the exterior tab 233 may abut the outside of the housing rim 112. In a third step 330, the locking tab 113 of the housing 110 is inserted into the locking tab receiver 237 of the cover 200. In some embodiments, the locking tab 113 is received by both the locking tab receiver 237 and one of the recesses 236, and the non-locking tab 114 is received by a separate recess 236. In a fourth step 340, an upper portion of the housing rim 112 is inserted into the upper portion of the groove 231. Specifically, the portion of the groove 231 above the recesses 236 and thus far unattached is now inserted, thereby completely installing the cover 200 onto the hammer work tool 100.

It is worth mentioning that any and all of the foregoing procedure may be carried out by a single user without the use of additional tools. Moreover, it should be understood that some or all of the steps may require the user to bend, squeeze, push, pull, twist or otherwise manipulate either the cover 200 or the housing 110 to properly affix the two components. The steps of method 300 may be executed in a different order from those delineated or additional steps may be included, so long as the dust cover 200 is securely installed onto the hammer work tool 100. Lastly, in some embodiments, the steps of method 300 may be reversed and negated in a parallel detachment process.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A dust cover for a hammer work tool, comprising:
- a plate having an interior surface, an exterior surface, and a perimeter;
- a plurality of interior ribs extending from the interior surface;
- a handle extending from the exterior surface; and
- a locking tab receiver.

2. The dust cover according to claim 1, wherein the dust cover is compression molded and further comprises a wire enclosed inside the dust cover.

3. The dust cover according to claim 1 further comprising a groove that comprises:
- an interior tab proximal to the interior surface;
- an exterior tab proximal to the exterior surface; and
- a valley formed between the interior tab and the exterior tab;
- wherein the interior tab is longer than the exterior tab and further comprises an entry chamfer.

4. The dust cover according to claim 1, further comprising one or more exterior ribs extending from the exterior surface.

5. The dust cover according to claim 4, wherein one of the exterior ribs doubles as the handle or multiple exterior ribs double as multiple handles.

6. The dust cover according to claim 1, further comprising one or more recesses with the locking tab receiver being located in one of the recesses.

7. The dust cover according to claim 1, further comprising a circular channel connecting the exterior surface to the interior surface and radiused for a hose.

8. A hammer work tool, comprising:
- a housing having a housing opening, a housing rim defining the housing opening, and a locking tab protruding from the housing rim;
- a power cell enclosed inside the housing, the power cell including a valve body and an accumulator;
- a tool member operatively associated with the power cell; and
- a dust cover, further comprising:
  - a plate having an interior surface, an exterior surface, and a perimeter;
  - a plurality of interior ribs extending from the interior surface;
  - a handle extending from the exterior surface;
  - a groove; and
  - a locking tab receiver;
- wherein the groove is configured to receive the housing rim and the locking tab receiver is configured to receive the locking tab.

9. The hammer work tool according to claim 8, further comprising a wire enclosed inside the dust cover.

10. The hammer work tool according to claim 8, wherein the dust cover is compression molded.

11. The hammer work tool according to claim 8, the groove further comprising:
- an interior tab proximal to the interior surface;
- an exterior tab proximal to the exterior surface; and
- a valley formed between the interior tab and the exterior tab;
- wherein the interior tab is longer than the exterior tab and further comprises an entry chamfer; and
- wherein the interior tab is configured to abut an inside of the housing rim and the exterior tab is configured to abut an outside of the housing rim.

12. The hammer work tool according to claim 8, further comprising one or more exterior ribs extending from the exterior surface of the dust cover.

13. The hammer work tool according to claim 12, wherein one of the exterior ribs of the dust cover doubles as the handle or multiple exterior ribs double as multiple handles.

14. The hammer work tool according to claim 8, further comprising one or more recesses on the dust cover with the locking tab receiver being located in one of the recesses configured to receive the locking tab.

15. The hammer work tool according to claim 8, the dust cover further comprising a circular channel connecting the exterior surface to the interior surface and radiused for a hose.

16. The hammer work tool according to claim 8, wherein the dust cover is detachable, such that:
- when detached, the housing opening provides access to the valve body and the accumulator; and
- when attached, the dust cover prevents particulate matter from entering the housing.

17. The hammer work tool according to claim 16, wherein the dust cover can be attached and detached by a single user without the use of additional tools.

18. The hammer work tool according to claim 16, wherein the dust cover further protects against impacts and projectiles when attached.

19. The hammer work tool according to claim 8, further comprising a mounting bracket configured for attachment to a work machine.

20. A method for attaching a dust cover onto a hammer work tool, comprising:
- providing a dust cover and a hammer work tool;
- inserting a lower portion of a housing rim of the hammer work tool into a lower portion of a groove of the dust cover;
- inserting a locking tab of the hammer work tool into a locking tab receiver of the dust cover; and
- inserting an upper portion of the housing rim into an upper portion of the groove;

wherein the method is carried out by a single user without the use of additional tools.

* * * * *